(12) United States Patent
Johnson

(10) Patent No.: US 11,280,365 B2
(45) Date of Patent: Mar. 22, 2022

(54) TOOLING ASSEMBLY AND METHOD FOR INSTALLATION OF A FRANGIBLE FASTENER

(71) Applicant: The Boeing Company, Chicago, IL (US)

(72) Inventor: Joshua R. Johnson, Atlanta, GA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 16/676,930

(22) Filed: Nov. 7, 2019

(65) Prior Publication Data

US 2020/0124077 A1    Apr. 23, 2020

Related U.S. Application Data

(62) Division of application No. 15/788,493, filed on Oct. 19, 2017, now Pat. No. 10,495,128.

(51) Int. Cl.
| | | |
|---|---|---|
| *F16B 31/02* | (2006.01) | |
| *B23P 19/06* | (2006.01) | |
| *F16B 19/05* | (2006.01) | |
| *B25B 23/00* | (2006.01) | |
| *B25B 23/14* | (2006.01) | |
| *B25B 17/00* | (2006.01) | |

(52) U.S. Cl.
CPC .......... *F16B 31/021* (2013.01); *B23P 19/065* (2013.01); *B25B 17/00* (2013.01); *B25B 23/0057* (2013.01); *B25B 23/0085* (2013.01); *B25B 23/1415* (2013.01); *F16B 19/05* (2013.01)

(58) Field of Classification Search
CPC ...... F16B 31/02; F16B 31/021; F16B 31/027; F16B 19/05; B23P 19/065; B25B 17/00; B25B 13/488; B25B 21/001; B25B 21/02; B25B 23/0057; B25B 23/1415
See application file for complete search history.

(56) References Cited

U.S. PATENT DOCUMENTS 5,305,666 A * 4/1994 LaTorre ................ B25B 13/463
                                                                    81/55
5,860,778 A    1/1999 Keener
(Continued)

FOREIGN PATENT DOCUMENTS

CN    103506990 A    1/2014
CN    203738664 U    7/2014

*Primary Examiner* — Christopher M Koehler
(74) *Attorney, Agent, or Firm* — Felix L. Fischer

(57) ABSTRACT

A tooling assembly for fastener installation has a socket body reversibly rotatable by a driving mechanism. A bore in the socket body has a first end portion and a central portion incorporating threads. A second end portion of the bore receives and engages a severable section of a frangible fastener. A pin is received in the bore and constrained from rotation by the driving mechanism. The pin has an ejection shaft with mating threads selectively receivable in the threads of the central portion of the bore. The socket body is freely rotatable with the mating threads positioned in the first end portion of the bore. Rotation of the socket body in torques the frangible fastener on a stud fracturing the severable section. Reverse rotation of the socket body engages the mating threads in the threads translating the pin. The ejection shaft ejects the severable section from the second end portion.

20 Claims, 13 Drawing Sheets

(56) References Cited

U.S. PATENT DOCUMENTS

| | | | |
|---|---|---|---|
| 6,324,946 B1* | 12/2001 | Gasser | F16B 31/021 |
| | | | 81/121.1 |
| 8,430,001 B2* | 4/2013 | Ortiz | B25B 13/06 |
| | | | 81/124.1 |
| 9,120,209 B1* | 9/2015 | Schevers | B25B 21/002 |
| 2014/0002671 A1 | 1/2014 | Stanfield et al. | |
| 2017/0246715 A1* | 8/2017 | Mathis | B23P 19/06 |

* cited by examiner

TOOLING ASSEMBLY AND METHOD FOR INSTALLATION OF A FRANGIBLE FASTENER

REFERENCE TO RELATED APPLICATIONS

This application is a divisional of U.S. application Ser. No. 15/788,493 filed on Oct. 19, 2017 entitled TOOLING ASSEMBLY AND METHOD FOR INSTALLATION OF A FRANGIBLE FASTENER issued as U.S. Pat. No. 10,495,128 on Dec. 3, 2019, having a common assignee with the present application, the disclosure of which is incorporated herein by reference.

BACKGROUND INFORMATION

Field

Embodiments of the disclosure relate generally to tools for fastener installation and more particularly to implementations for an installation tool for frangible fasteners.

Background

Frangible fasteners have become a highly efficient replacement for standard nut and bolt applications in structural fabrication. Current automated processes allow for installation of threaded nuts over threaded studs, which can use expensive tooling and repeated recalibration of torque settings on the tooling. Manual tooling used to install frangible fasteners is significantly less expensive and requires less maintenance, making such tooling a more desirable option than automated tooling. However, disposing of the fractured portion of the fastener should be appropriately accomplished.

SUMMARY

Exemplary implementations provide a tooling assembly for fastener installation having a socket body configured to be engaged by a driving mechanism, the socket body reversibly rotatable by the driving mechanism. The socket body has a bore with a first end portion extending from a first end of the socket body and open at the first end, a central portion incorporating threads and a second end portion extending to a second end of the socket body and open at the second end. The second end portion is configured to receive and engage a severable section of a frangible fastener. A pin is received in the bore in the socket body and constrained from rotation by the driving mechanism. The pin has an ejection shaft with mating threads selectively receivable in the threads of the central portion of the bore. The socket body is freely rotatable with the mating threads positioned in the first end portion of the bore. Rotation of the socket body in a first direction torques the frangible fastener on a stud fracturing the severable section. Rotation of the socket body in a second direction engages the mating threads in the threads translating the pin in a longitudinal direction. The ejection shaft engages the severable section and urges the severable section from the second end portion.

The exemplary implementations allow a method for installation of a frangible fastener. A tooling assembly having a socket body and a pin is engaged by a driving mechanism. A frangible fastener is inserted in a socket in a second end portion of a bore in the socket body and engaged by a frictional retaining element. The driving mechanism is positioned to engage the frangible fastener with a stud. The pin is resiliently urged in the bore in a longitudinal direction to engage a keyed tip of the pin with the stud and rotation of the pin and stud is prevented. The driving mechanism rotates the socket body in a first direction torqueing the frangible fastener on the stud and fracturing a severable section of the frangible fastener. The severable section is retained in the frictional retaining element. The socket body is then removed from the stud by the driving mechanism and positioned for disposal of the severable section. The socket body is rotated by the driving mechanism in a second direction, opposite the first direction and mating threads on the pin engage threads in a central portion of the bore to translate the pin urging the severable section out of contact with the frictional retaining element and ejecting the severable section from the second end portion.

BRIEF DESCRIPTION OF THE DRAWINGS

The features, functions, and advantages that have been discussed can be achieved independently in various implementations of the present invention or may be combined in yet other implementations further details of which can be seen with reference to the following description and drawings.

DETAILED DESCRIPTION

The exemplary implementations described herein provide a tooling assembly for automated installation of frangible fasteners onto a stud and disposal of a severable section of the fastener. The tooling assembly is configured to be attached to a driving mechanism, such as an end effector.

The tooling assembly includes a socket body operatively engaged for reversible rotation by the driving mechanism and a pin configured to selectively engage the socket body. The socket body has a central bore axially extending between a first end and a second end spaced from the first end. The bore receives the pin and incorporates at least three interconnected portions, a first end portion, a central portion and a second end portion. The central portion includes a plurality of threads. Additionally, the socket body defines a retaining recess extending from the bore, proximate the second end, for accepting a retaining device such as a retainer ring, therein, for removably securing a severable section of the frangible fastener. More specifically, the retaining device holds the frangible fastener in place prior to and during installation and retains the severable section of the frangible fastener, which is broken off during installation, until ejected by the pin. The pin has a head configured to be constrained by the driving mechanism, a body extending from the head, an ejection shaft extending from the body with the ejection shaft including a plurality of mating threads, and a keyed tip extending from the ejection shaft.

During operation, the keyed tip as constrained by the driving mechanism engages the stud for preventing rotation of the stud and the socket body is able to freely rotate in a first direction relative to the pin. The fastener is placed over the stud and the socket body is rotated, in the first direction, to torque and sever the frangible fastener, with a locking section of the frangible fastener remaining on the stud and the severable section retained in the socket body by the retaining member. The tooling assembly is then moved to a disposal area, and the socket body is rotated in a second direction, opposite the first direction. When the socket is rotated in the second direction, the threads on the pin engage the threads within the socket body translating the pin along the central bore, toward the second end of the socket body, to engage and eject the severable section of the fastener.

Figure 1:
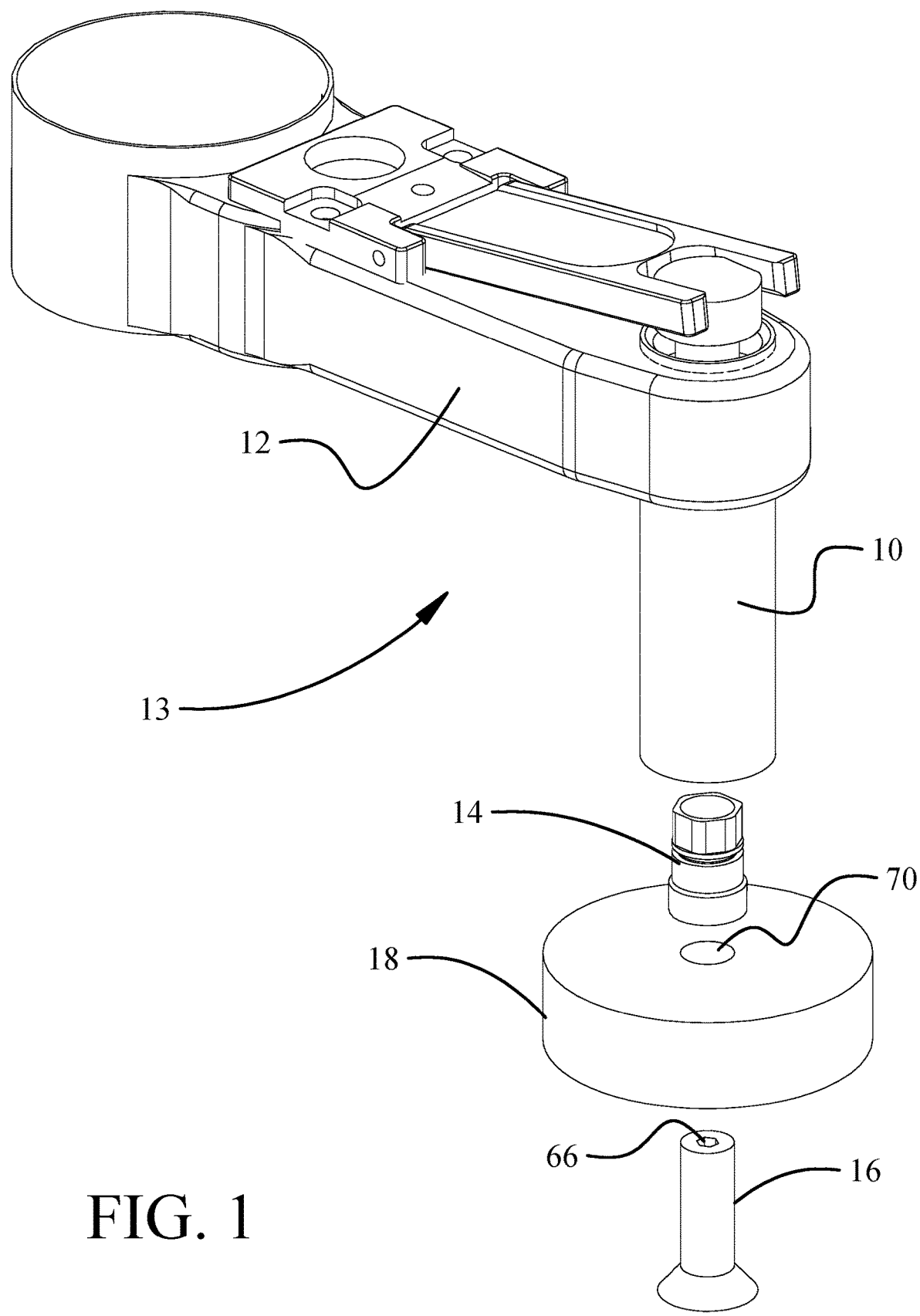
FIG. 1 is a pictorial representation of an upper exploded view of an implementation of a frangible fastener installation tool with the frangible fastener, structural element and stud shown for relative orientation.
Figure 2:
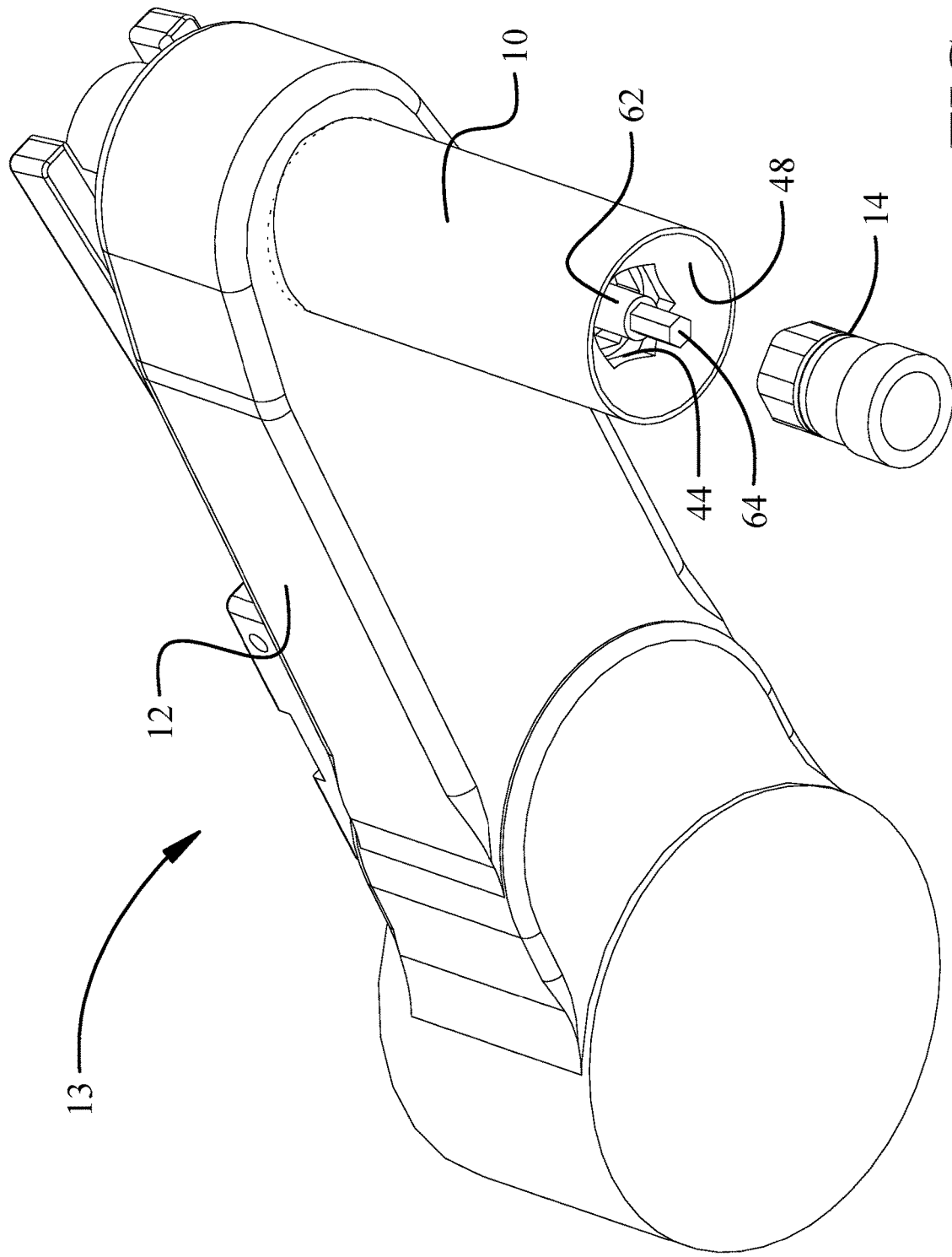
FIG. 2 is a pictorial representation of a lower exploded view of the implementation of the installation tool and the frangible fastener.
Figure 3:
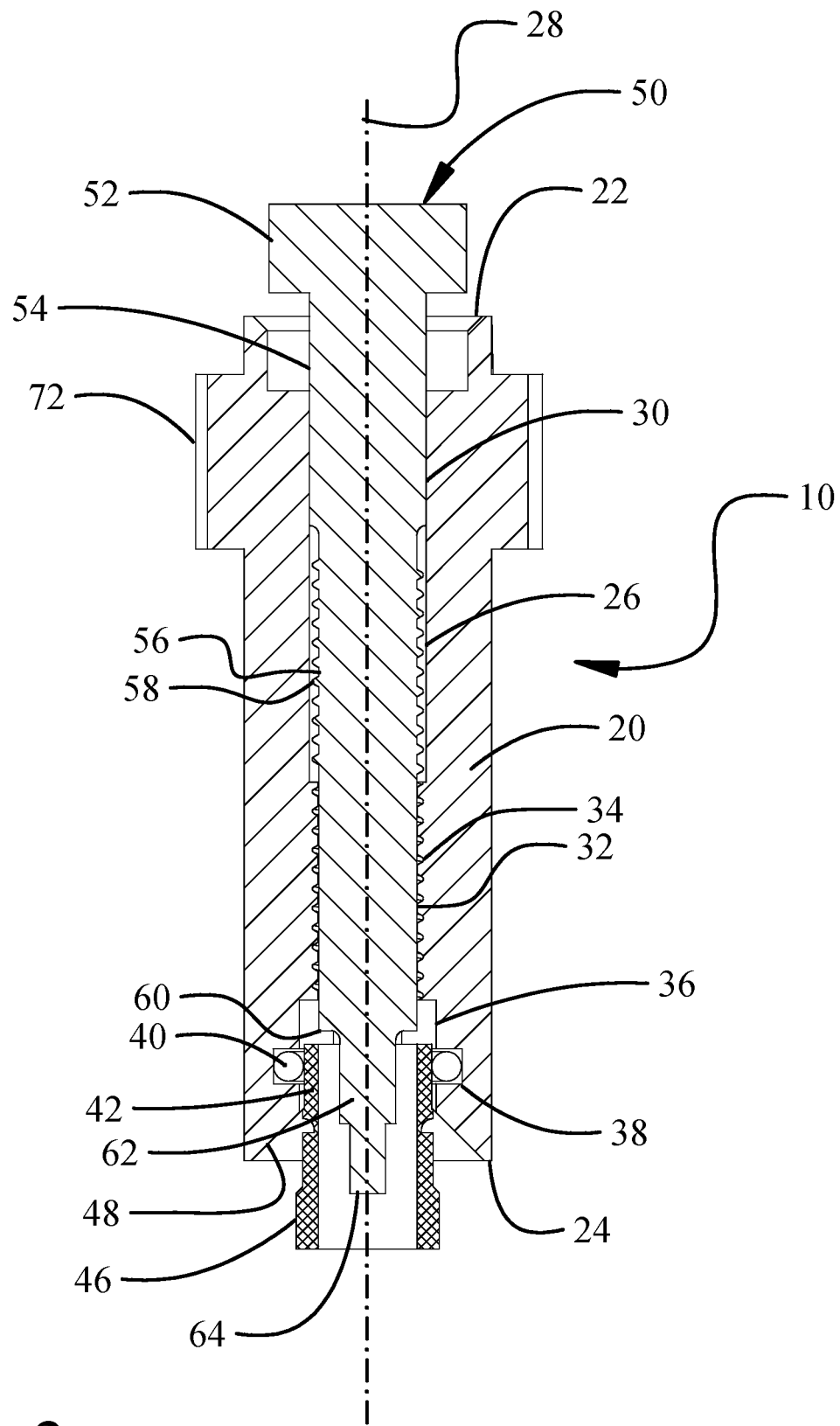
FIG. 3 is a section view of a rotating socket body of the installation tool with a lock pin and frangible fastener engaged.

Referring to the drawings, FIGS. 1 and 2 show an exemplary implementation of a tooling assembly 10 engaged by a driving mechanism 12 of a fastener installation system 13. The tooling assembly 10 is configured to engage a frangible fastener 14 for attachment to a stud 16 inserted through a structure 18. The tooling assembly 10 has a socket body 20 as seen in FIG. 3. The socket body 20 has a first end 22 for tool attachment and a second end 24 for engagement with the frangible fastener 14. A bore 26 extends through the socket body 20 on a central axis 28. The bore 26 has a first end portion 30 open at and extending from the first end 22, a central portion 32 which incorporates threads 34, and a second end portion 36 proximate and opening onto the second end 24 of the socket body 20. A retaining recess 38 extends circumferentially from the second end portion 36 and accommodates a frictional retaining device, such as an O-ring 40, which engages a severable section 42 of the frangible fastener 14. The severable section 42 may have a hexagonal periphery or similar geometry to be received in the second end portion 36 of the bore 26 with a complimentary hexagonal socket 44 (best seen in FIG. 2). The frangible fastener 14 has a collar or locking section 46 configured to engage the stud 16, as will be describe in greater detail subsequently. The second end portion 36 of the bore 26 may incorporate an expanded guidance cone 48 at the second end 24 to assist in insertion of the frangible fastener 14 into the socket body 20.

A pin 50 is received in the bore 26 of the socket body 20. The pin 50 has a head 52 and a body 54. An ejection shaft 56 having mating threads 58 to be selectively received in the threads 34 in the central portion 32 of the bore 26, as will be described in greater detail subsequently, extends from the body 54. The first end portion 30 of the bore 26 is sized to receive the body 54 of the pin 50 with clearance for lubrication, if needed, and free rotational and longitudinal motion while providing clearance for the mating threads 58 on the ejection shaft 56. With the pin 50 positioned in the bore 26 with the mating threads 58 in the first end portion 30, the socket body 20 is freely rotatable relative to the pin 50. A shoulder 60 is present on the ejection shaft 56 to selectively engage the severable section 42 of the frangible fastener 14, as will be described in greater detail subsequently. A keyed tip 62 extends from the ejection shaft 56. For the implementation shown, the keyed tip 62 employs a hex key 64 (best seen in FIG. 2) sized to be received in a hex bore 66 in the stud 16 (best seen in FIG. 1).

Figure 4:
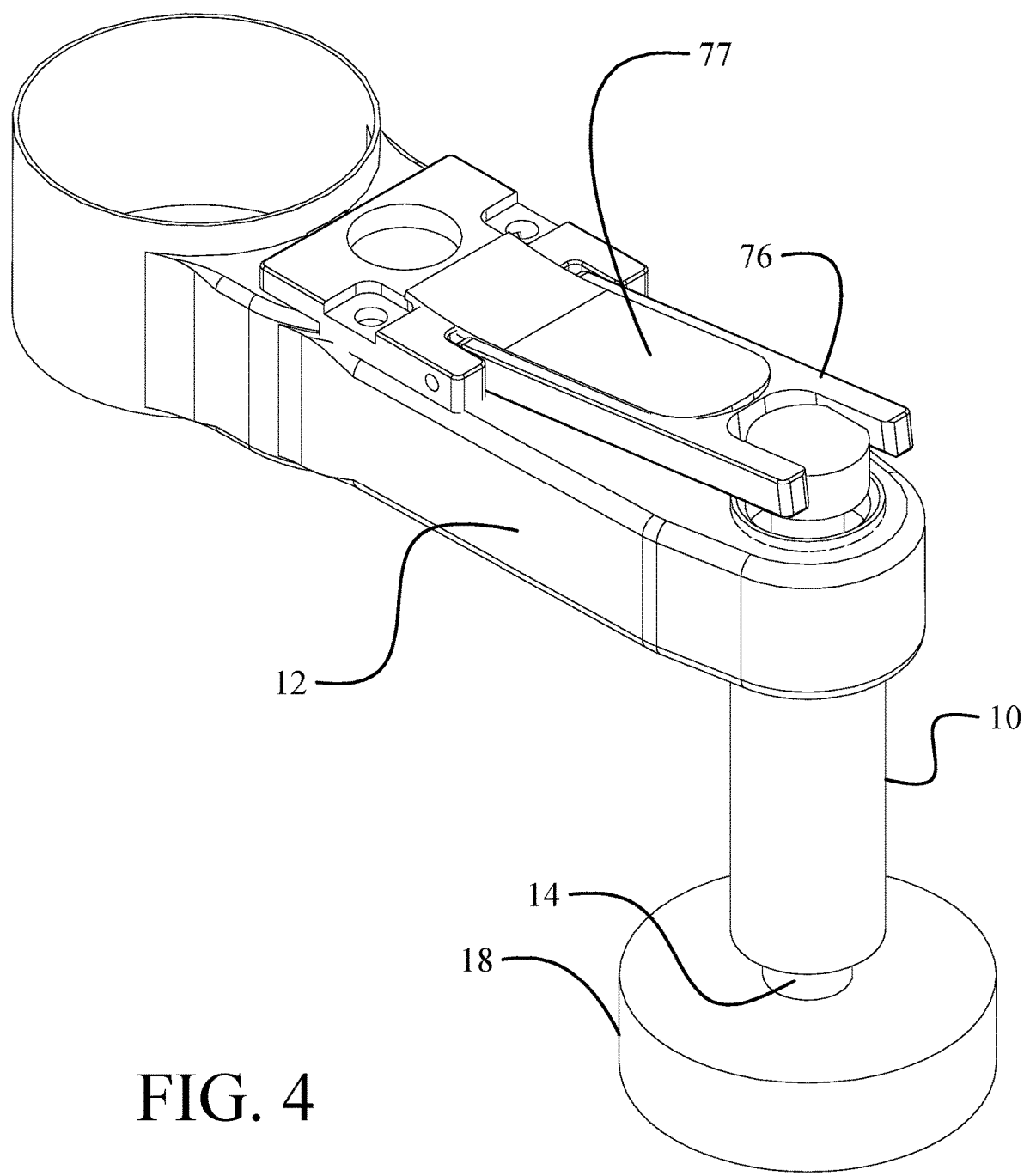
FIG. 4 is an upper pictorial representation of the installation tool engaged to the frangible fastener during installation on the structural element.
Figure 5:
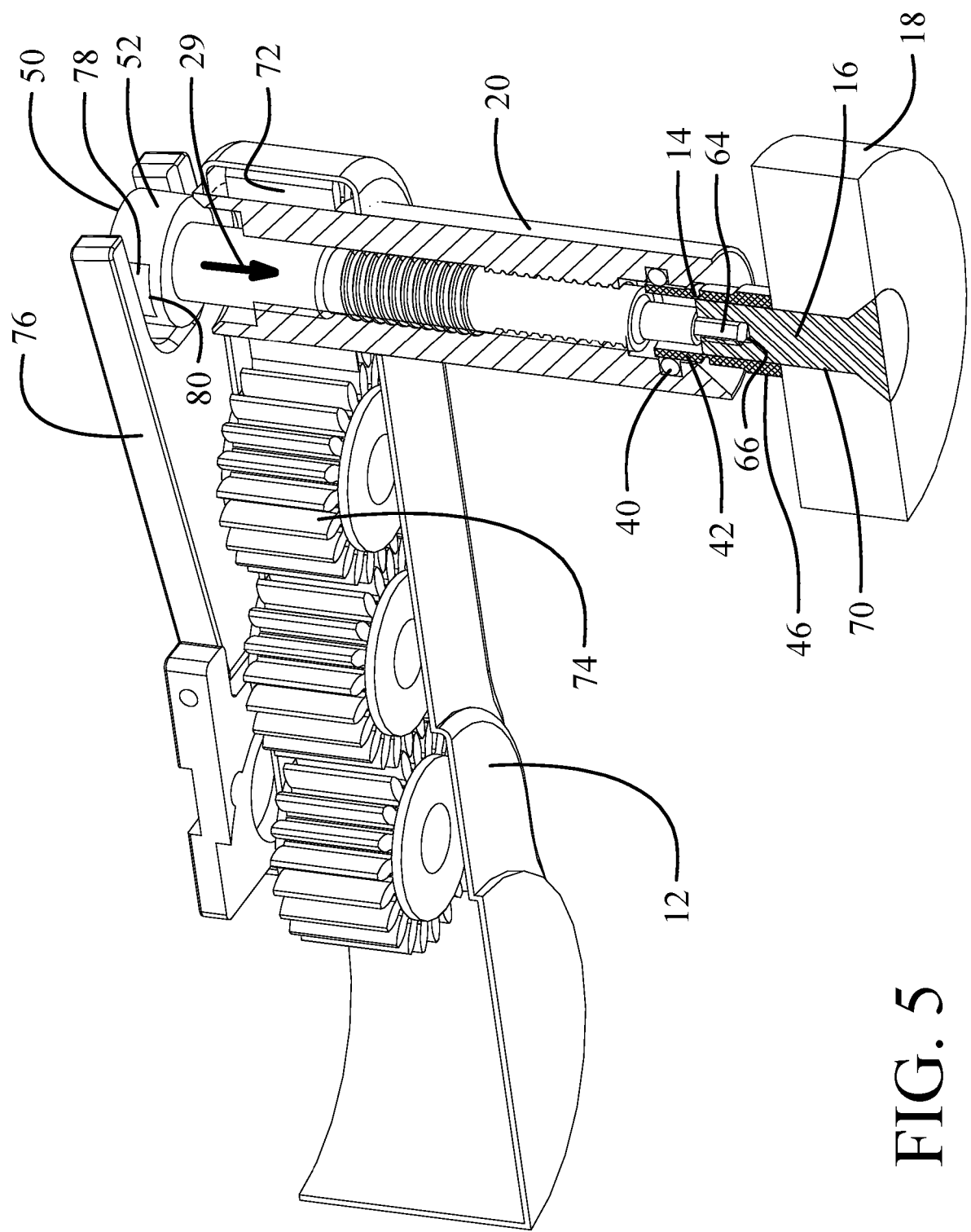
FIG. 5 is a section view of the installation tool with the socket body engaged to the frangible fastener and the keyed tip of the pin engaging the stud extending through the structural element.
Figure 6:
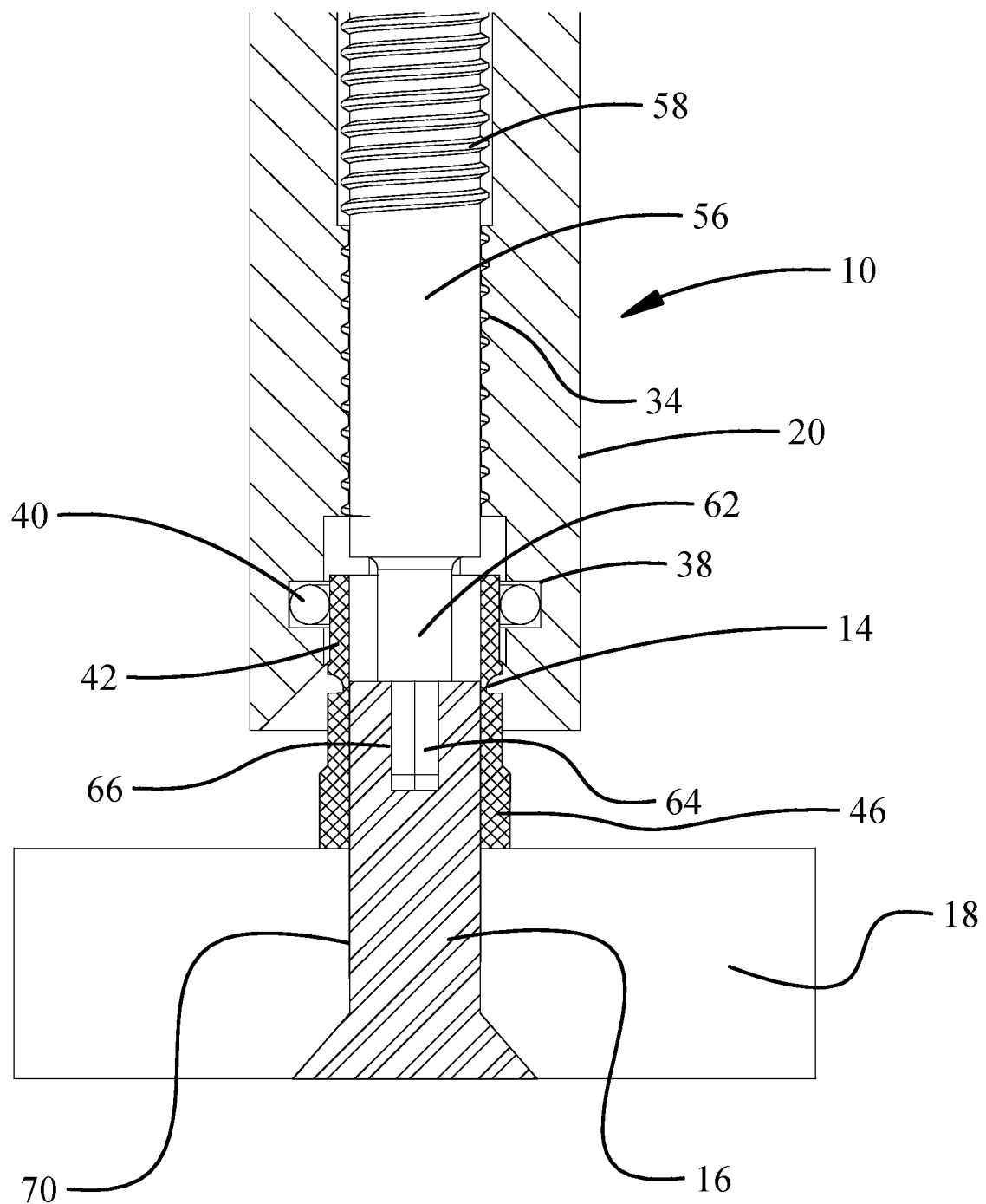
FIG. 6 is a detailed section view of the socket body showing the socket engaged to the frangible fastener during installation on the stud.

As seen in FIGS. 4, 5, and 6, with the stud 16 inserted into a hole 70 (seen in FIG. 1) in the structure 18, the frangible fastener 14 is inserted into the second end portion 36 of the bore 26 in the socket body 20 and retained with engaging the severable section 42 in the O-ring 40. The socket body 20 has a gear 72 operably engaged for reversible rotation by a gear train having at least one drive gear 74 in the driving mechanism 12. The locking section 46 of frangible fastener 14 is received over the stud 16 with engagement of mutually cooperating threads (not shown) induced by rotation of the socket body 20 in a first direction.

Pin 50 is engaged by a resilient rotation prevention mechanism, such as a fork 76 on the driving mechanism 12, which urges the pin 50 along the central axis 28 in a longitudinal direction 29 to engage the hex key 64 of the keyed tip 62 into the hex bore 66 of the stud 16. The fork 76 may engage flats 78 or comparable restraints on the head 52 of the pin 50 to prevent rotation of the pin 50 and engaged stud 16, and the flats 78 may terminate in ledges 80 to react the longitudinal resilient pressure on the pin 50 by the fork 76. A leaf spring 77 coupled to the fork 76 provides the resilient longitudinal pressure for the exemplary implementation. While shown in the exemplary implementation as a fork, the rotation prevention mechanism may be a cap engaging the head 52, a rod inserted in a transverse bore in the head 52, or other suitable structure. Threads 34 in the central portion 32 of the bore 26 and mating threads 58 on the ejection shaft 56 of the pin 50 are respectively positioned whereby with socket body 20 positioned at full engagement of the frangible fastener 14 on the stud 16 and corresponding positioning of pin 50 with hex key 64 inserted in the hex bore 66, the mating threads 58 remain in the first end portion 30 of the bore 26 allowing free rotation of the socket body 20 relative to the pin 50.

Figure 7:
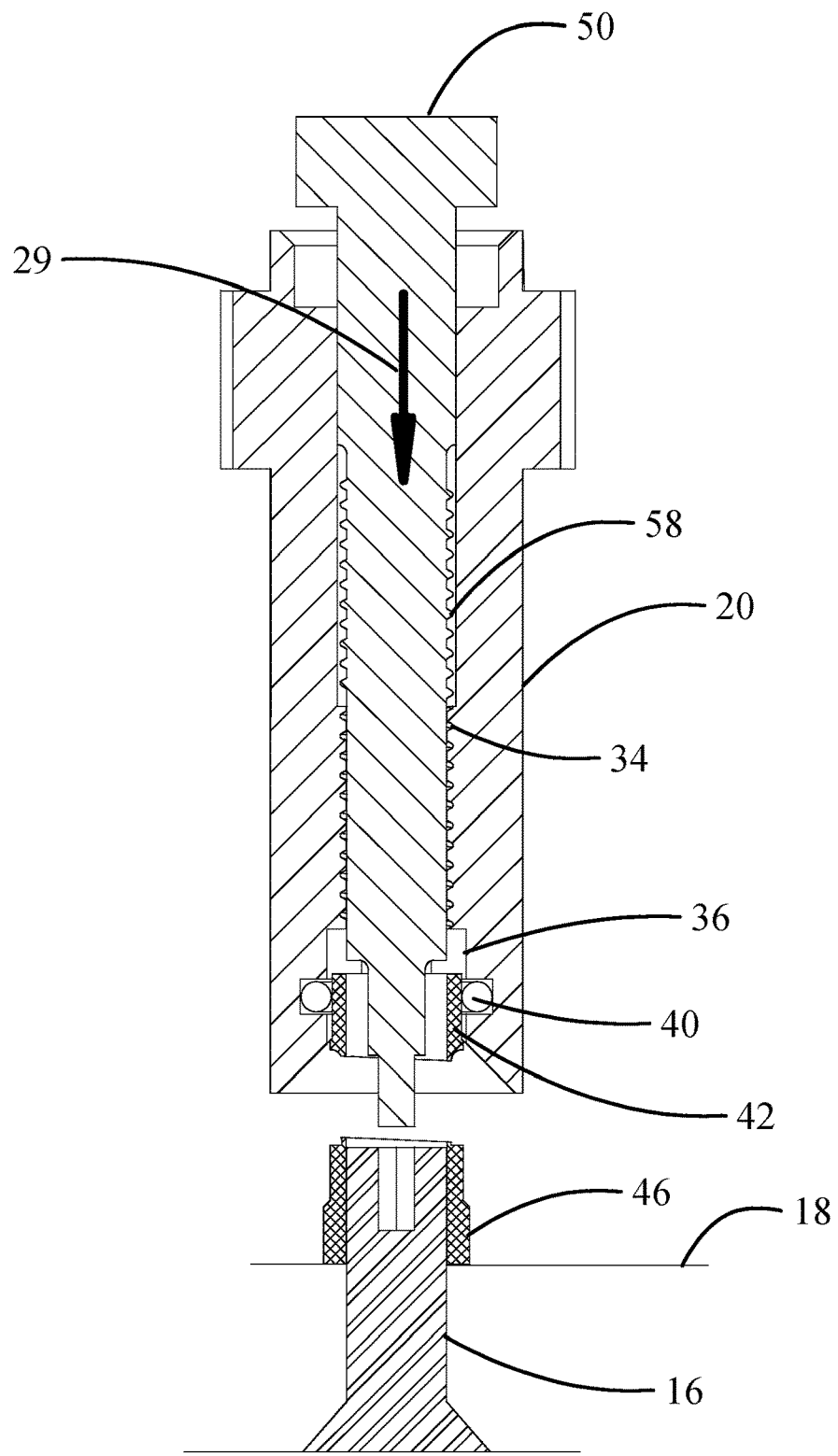
FIG. 7 is a section view of the socket body being withdrawn from the stud after fracture of the frangible fastener.
Figure 8:
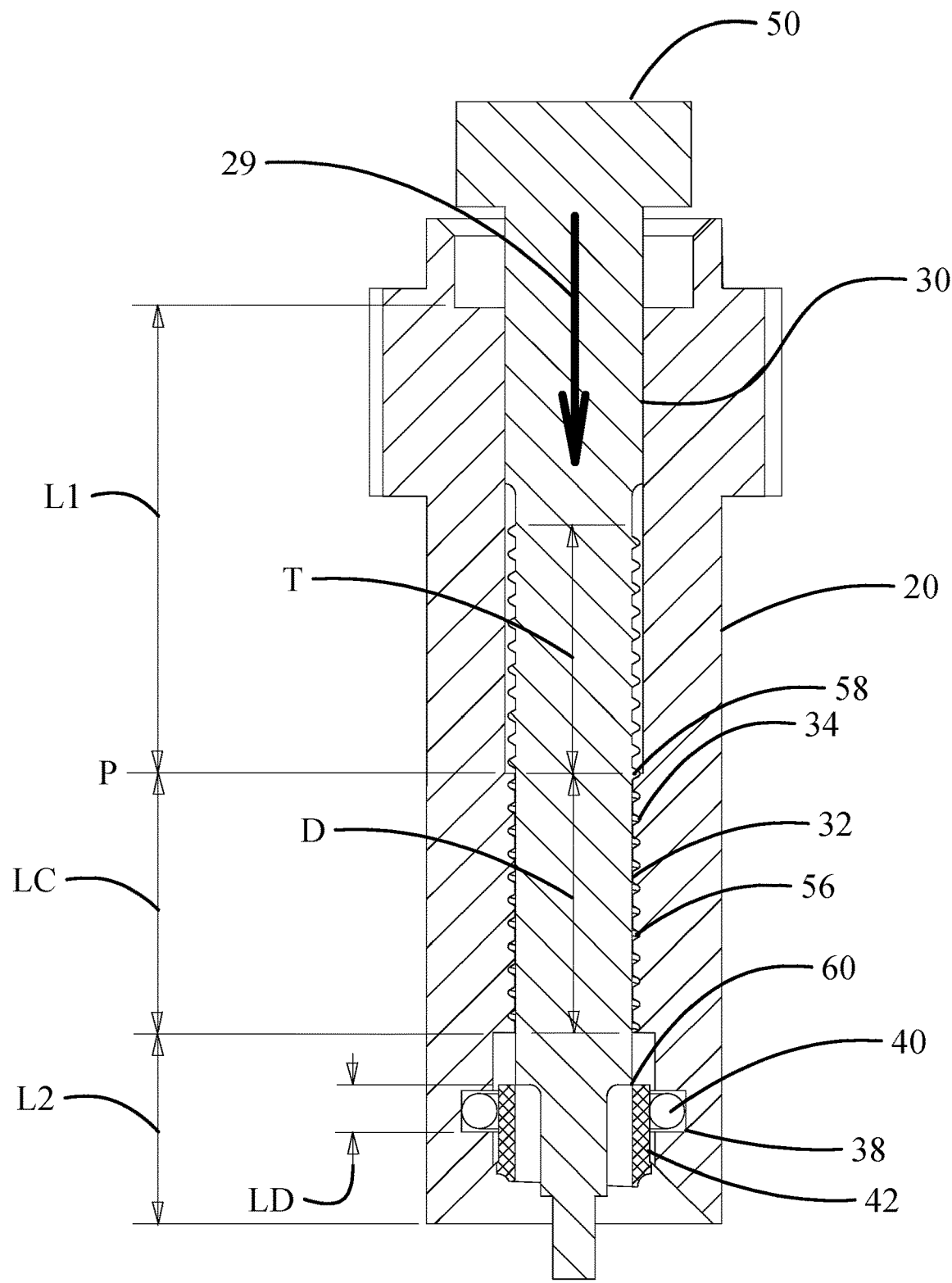
FIG. 8 is a section view of the socket body with the lock pin in initial engagement with a severable section of the frangible fastener retained in the socket body.

Torqueing of the frangible fastener 14 with rotation of the socket body 20 in the first direction results in fracturing of the frangible fastener 14 as seen in FIG. 7. The driving mechanism 12 then stops rotation of the socket body 20 and is elevated to remove the tooling assembly 10 from the stud 16. The severable section 42 remains engaged in the second end portion 36 of the bore 26 retained by the O-ring 40. Removal of the socket body 20 and pin 50 from the stud 16 results in pin 50 being resiliently urged in longitudinal direction 29 to a bottom of the first end portion 30 by the fork 76, placing the mating threads 58 of the pin 50 adjacent the threads 34 of the socket body 20 as seen in FIGS. 7 and 8. With the mating threads 58 at the bottom of first end portion 30, shoulder 60 of the ejection shaft 56 is brought into proximity of or contact with the severable section 42 retained by the O-ring 40.

Figure 9:
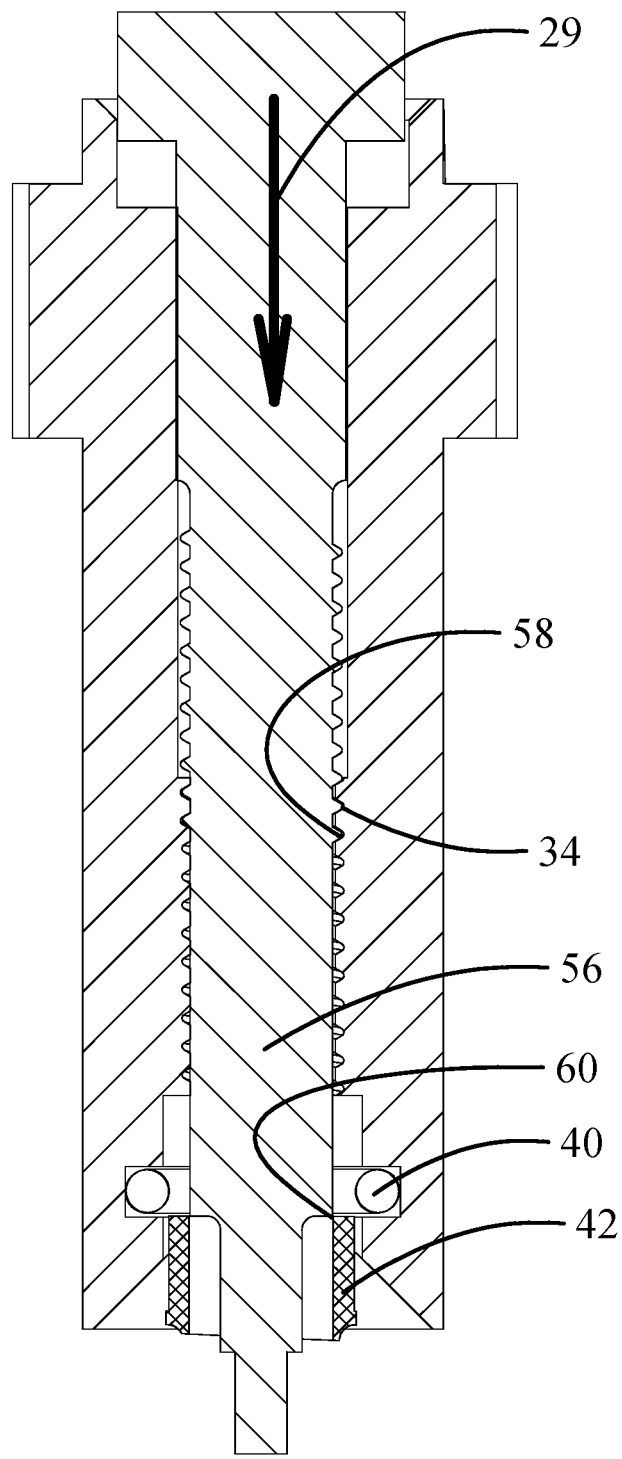
FIG. 9 is a section view of the socket body with the lock pin rotated to expel the severable section.
Figure 10:
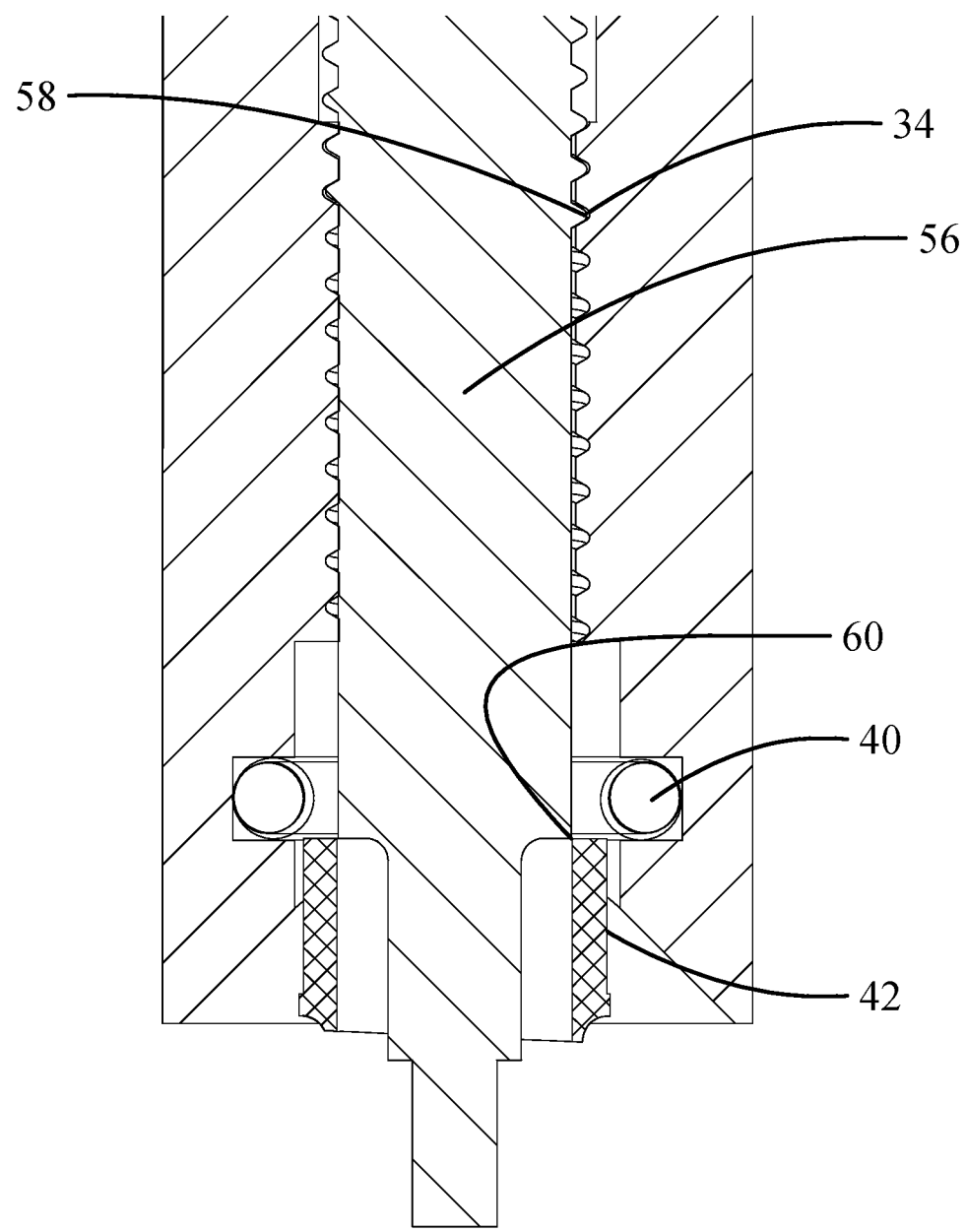
FIG. 10 is a detailed section view demonstrating displacement of the severable section from the retaining ring.
Figure 11:
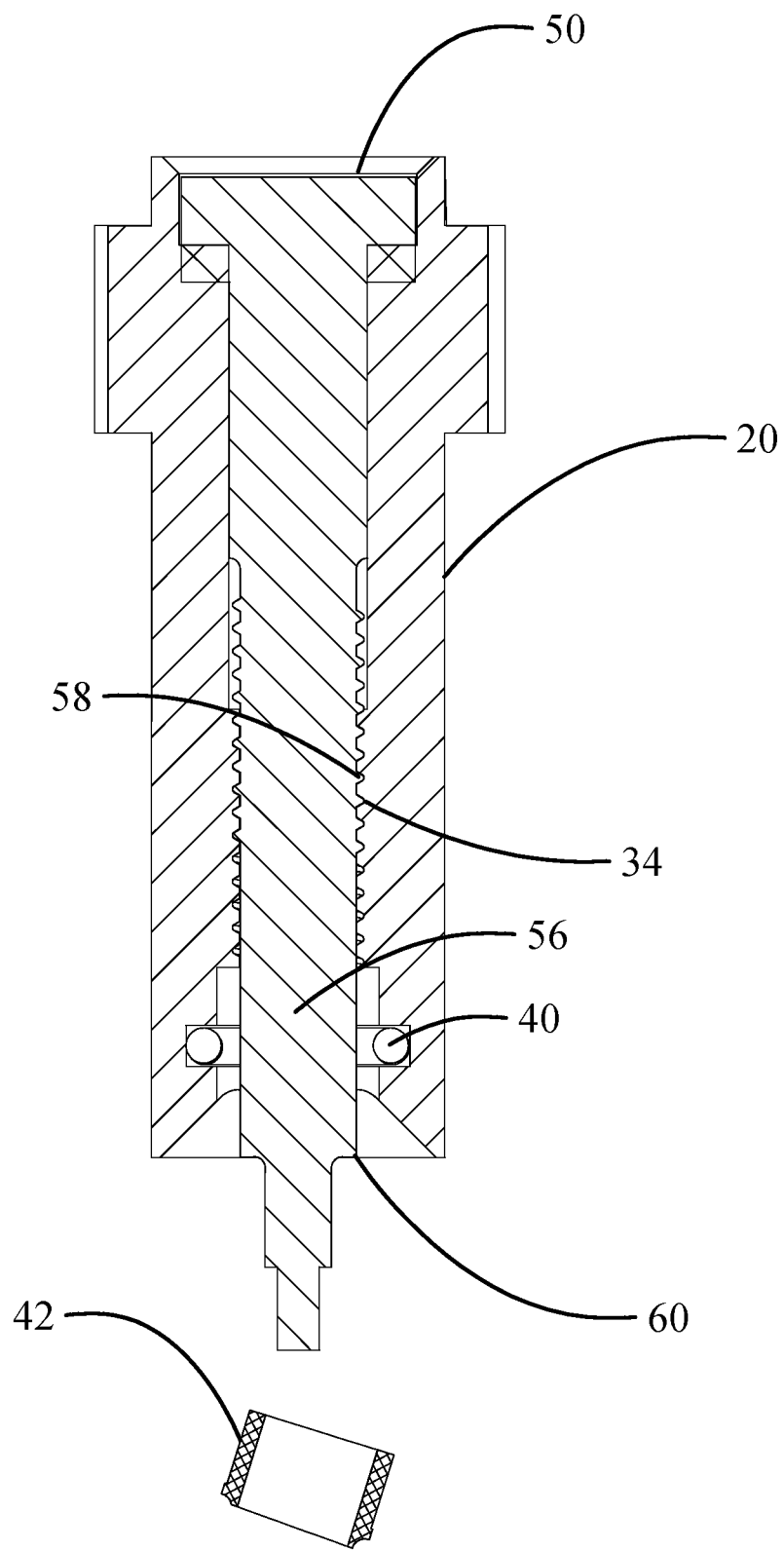
FIG. 11 is a section view of the socket body after expulsion of the severable section; and, FIGS. 12A and 12B are a flow chart showing a method for frangible fastener installation employing the disclosed implementation.

The driving mechanism 12 is then moved to a disposal location and socket body 20 is rotated by the driving mechanism 12 in a second direction, opposite the first direction, engaging mating threads 58 in threads 34 and translating the pin 50 in the longitudinal direction 29 causing shoulder 60 to urge severable section 42 out of contact with the O-ring 40 in second end portion 36 of the bore 26 as seen in FIGS. 9 and 10. Further advancement of ejection shaft 56 by rotation of the socket body 20 in the second direction causes the severable section 42 to be ejected from the second end portion 36 for disposal as seen in FIG. 11.

Rotation of the socket body 20 by the driving mechanism 12 in the first direction causes engaged threads 34 and mating threads 58 to translate the pin 50 opposite to longitudinal direction 29 until the mating threads 58 are withdrawn from the threads 34. With the threads 34 no longer engaged the tooling assembly 10 is in condition to accept another frangible fastener 14 for installation.

In the exemplary implementation, to accomplish the desired translation of the pin 50 the first end portion 30 of the bore 26 and central portion 32 meet at an engagement point P as shown in FIG. 8. Mating threads 58 on the pin 50 have a thread length T. Threads 34 commence at engagement point P and extend into the central portion 32 with a thread depth D. Central portion 32 has a length LC and the thread depth D may extend over the entire length LC, as shown in the drawings of the exemplary implementation, or a portion of the length. The second end portion 36 has a length L2 sufficient to operatively engage the frangible fastener 14 in the socket 44 and the retaining element, O-ring 40. The thread length T is preferably at least as long as a disengagement length LD causing translation of the pin 50 from engagement of the shoulder 60 with the severable section 42 to disengagement of the severable section 42 from the retaining element, O-ring 40. If thread depth D is less than the disengagement length LD, any portion of the central portion 32 extending beyond the thread depth D can be relieved to allow translation of mating threads 58. In the exemplary implementation, length L2 of the second end portion 36 is greater than disengagement length LD to accommodate the guidance cone 48 and provide tolerance for depth of insertion of the frangible fastener 14 in the socket 44. Additionally thread length T is longer than disengagement length LD to allow extended translation of the ejection shaft 56 to completely eject the severable section 42 from the second end portion 36.

Figure 12A:
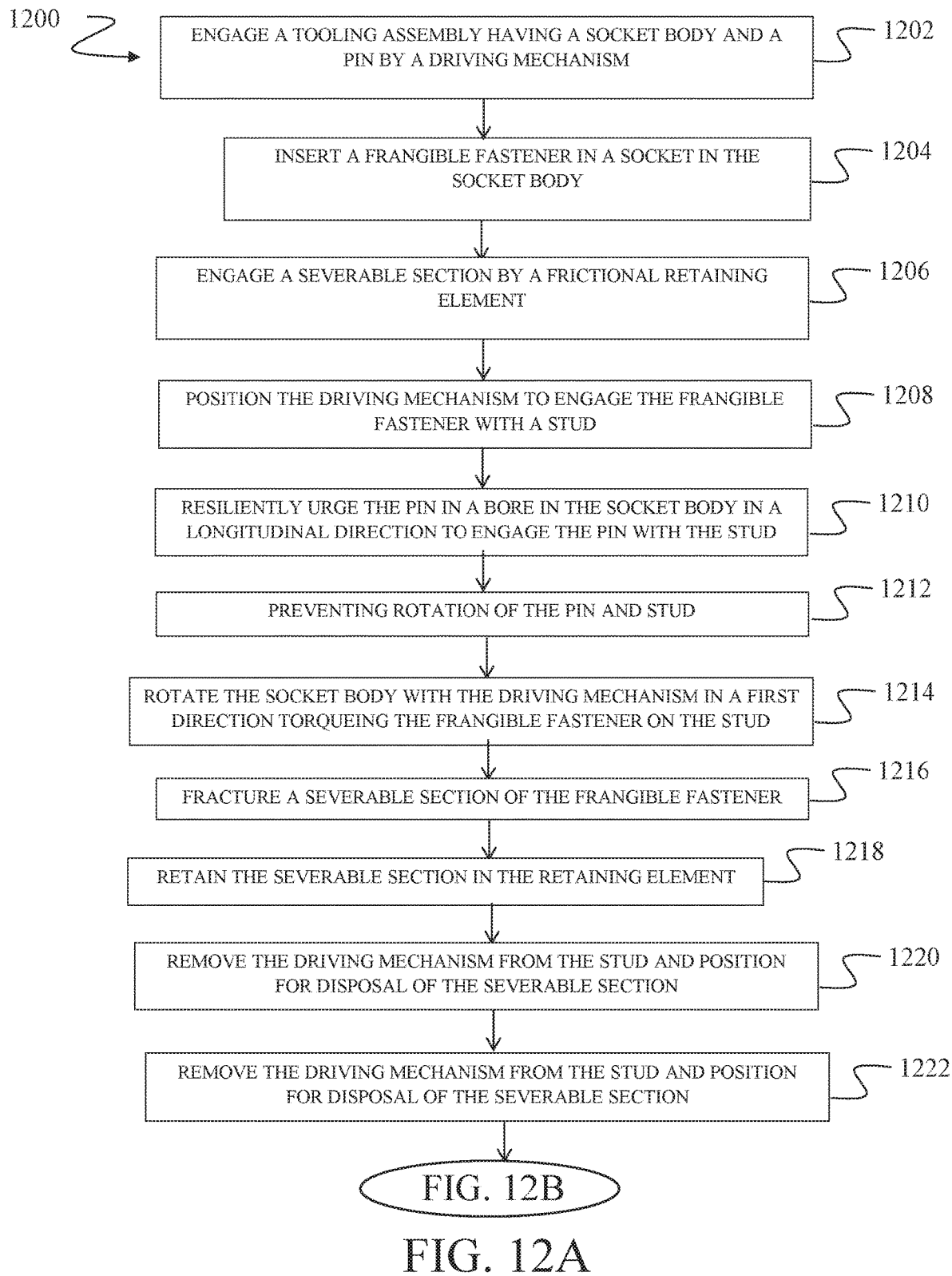
Figure 12B:
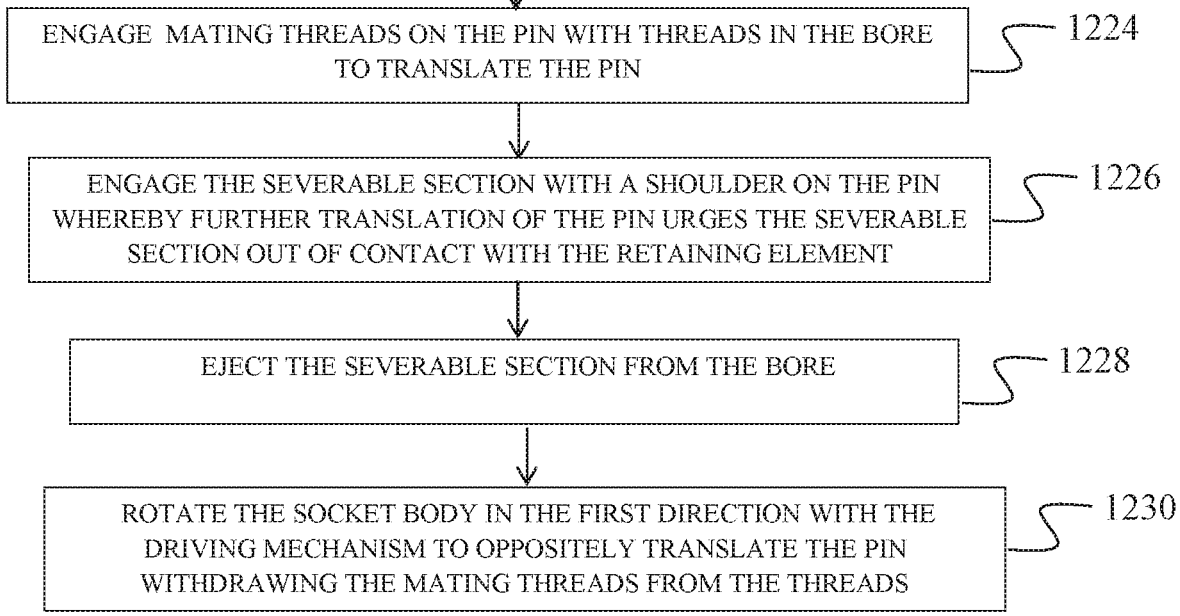

The exemplary implementation provides a method 1200 for installation of a frangible fastener 14 as shown in FIGS. 12A and 12B. A tooling assembly 10 having a socket body 20 and a pin 50 is engaged by a driving mechanism 12, step 1202. A frangible fastener 14 is inserted in a socket 44 in a second end portion 36 of a bore 26 in the socket body 20, step 1204 and a severable section 42 is engaged by a frictional retaining element, such as an O-ring 40, in a relieved retaining recess 38, step 1206. The driving mechanism 12 is positioned to engage the frangible fastener 14 with a stud 16, step 1208. A fork 76 resiliently urges the pin 50 in the bore 26 in a longitudinal direction 29 to engage a keyed tip 62 of the pin 50 with the stud 16, step 1210, the fork 76 preventing rotation of the pin 50 and stud 16, step 1212. The driving mechanism 12 rotates the socket body 20 in a first direction torqueing the frangible fastener 14 on the stud 16, step 1214, and fracturing the severable section 42 of the frangible fastener 14, step 1216. The severable section 42 is retained in the O-ring 40, step 1218. The driving mechanism 12 is then removed from the stud 16 and positioned for disposal of the severable section 42, step 1220. The socket body 20 is rotated by the driving mechanism 12 in a second direction, opposite the first direction, step 1222, and mating threads 58 on the pin 50 engage threads 34 in a central portion 32 of the bore 26 to translate the pin 50, step 1224. A shoulder 60 on the pin 50 engages the severable section 42 and further translation of the pin 50 urges the severable section 42 out of contact with the O-ring 40, step 1226, and ejects the severable section 42 from the second end portion 36, step 1228. The driving mechanism 12 then rotates the socket body 20 in the first direction to oppositely translate the pin 50 withdrawing the mating threads 58 from the threads 34, step 1230.

Having now described various implementations of the invention in detail as required by the patent statutes, those skilled in the art will recognize modifications and substitutions to the specific implementations disclosed herein. Such modifications are within the scope and intent of the present invention as defined in the following claims.

What is claimed is:

1. A method for installation of a frangible fastener using a tooling assembly having a socket body and a pin with a driving mechanism, the method comprising steps of:

inserting the frangible fastener in the socket body having a bore with a first end portion and a second end portion, the frangible fastener inserted in the second end portion;

positioning the driving mechanism to engage the frangible fastener with a stud;

resiliently urging the pin in the bore to engage the pin with the stud;

rotating the socket body in a first direction torquing the frangible fastener on the stud;

fracturing a severable section of the frangible fastener;

retaining the severable section of the frangible fastener in a frictional retaining element;

removing the socket body from the stud and positioning the socket body for disposal of the severable section;

engaging the severable section with a shoulder on the pin;

translating the pin to urge the severable section out of contact with the frictional retaining element by rotating the socket body in a second direction and engaging mating threads on the pin with threads in the bore to translate the pin; and ejecting the severable section from the second end portion.

2. The method as defined in claim 1, further comprising:
rotating the socket body with the driving mechanism in the first direction to oppositely translate the pin; and
withdrawing the mating threads from the threads.

3. The method as defined in claim 1, wherein the step of resiliently urging the pin in the bore to engage the pin with the stud further comprises urging the pin in a longitudinal direction to engage a keyed tip of the pin with the stud.

4. The method as defined in claim 1, further comprising a step of engaging the socket body with the driving mechanism, wherein:
the socket body is reversibly rotatable by the driving mechanism,
the first end portion of the bore extends from a first end of the socket body,
the first end portion of the bore is open at the first end of the socket body,
a central portion of the bore incorporates threads, and
the second end portion of the bore extends to a second end of the socket body.

5. The method as defined in claim 4, wherein the step of engaging the socket body with the driving mechanism comprises engaging a gear on the socket body with a reversibly rotatable gear train in the driving mechanism.

6. The method as defined in claim 4, further comprising engaging a head of the pin with a resilient rotation prevention mechanism in the driving mechanism.

7. The method as defined in claim 6, further comprising steps of:
   urging the pin in a longitudinal direction with the resilient rotation prevention mechanism; and
   preventing rotation of the pin.

8. The method as defined in claim 7, wherein the step of preventing rotation of the pin comprises engaging a fork in the resilient rotation prevention mechanism on flats on the head of the pin.

9. The method as defined in claim 7, wherein the step of resiliently urging the pin in the bore to engage the pin with the stud further comprises engaging a keyed tip of the pin in a bore in the stud.

10. The method as defined in claim 7, wherein the step of ejecting the severable section from the second end portion comprises rotating the socket body in the second direction and engaging the mating threads on the pin with the threads in the central portion of the bore to translate the pin.

11. The method as defined in claim 10, further comprising steps of:
    engaging the severable section with a shoulder on the pin; and
    urging the severable section out of contact with the frictional retaining element.

12. The method as defined in claim 11, wherein the step of urging the severable section out of contact with the frictional retaining element comprises rotating the mating threads on the pin through a disengagement length of the threads in the central portion of the bore to cause translation of the pin from engagement of the shoulder with the severable section to disengagement of the severable section from the frictional retaining element.

13. The method as defined in claim 12, further comprising:
    rotating the socket body with the driving mechanism in the first direction to oppositely translate the pin; and
    withdrawing the mating threads on the pin from the threads in the central portion of the bore.

14. The method as defined in claim 1, further comprising:
    engaging the socket body with the driving mechanism by engaging a gear on the socket body with a reversibly rotatable gear train in the driving mechanism, wherein:
      the socket body is reversibly rotatable by the driving mechanism,
      the first end portion of the bore extends from a first end of the socket body,
      the first end portion of the bore is open at the first end of the socket body,
      a central portion of the bore incorporates threads, and
      the second end portion extends to a second end of the socket body;
    engaging a head of the pin with a resilient rotation prevention mechanism in the driving mechanism, wherein the step of resiliently urging the pin in the bore comprises urging the pin in a longitudinal direction with the resilient rotation prevention mechanism; and
    preventing rotation of the pin.

15. The method as defined in claim 14, wherein the step of ejecting the severable section from the second end portion comprises:
    rotating the socket body in a second direction and engaging mating threads on the pin with the threads in the central portion of the bore to translate the pin;
    engaging the severable section with a shoulder on the pin; and
    urging the severable section out of contact with the frictional retaining element;
    rotating the socket body with the driving mechanism in the first direction to oppositely translate the pin; and
    withdrawing the mating threads on the pin from the threads in the central portion of the bore.

16. The method as defined in claim 1, further comprising a step of engaging the socket body with the driving mechanism, wherein:
    the socket body is reversibly rotatable by the driving mechanism,
    the first end portion of the bore extends from a first end of the socket body,
    the first end portion of the bore is open at the first end of the socket body,
    a central portion of the bore incorporates threads, and
    the second end portion of the bore extends to a second end of the socket body;
    wherein the step of engaging the socket body with the driving mechanism comprises engaging a gear on the socket body with a reversibly rotatable gear train in the driving mechanism; and
    further comprising engaging a head of the pin with a resilient rotation prevention mechanism in the driving mechanism.

17. The method as defined in claim 16 wherein the step of resiliently urging the pin in the bore to engage the pin with the stud further comprises engaging a keyed tip of the pin in a bore in the stud and further comprising steps of:
    urging the pin in a longitudinal direction with the resilient rotation prevention mechanism; and
    preventing rotation of the pin by engaging a fork in the resilient rotation prevention mechanism on flats on the head of the pin.

18. The method as defined in claim 17 wherein the step of ejecting the severable section from the second end portion comprises rotating the socket body in the second direction and engaging the mating threads on the pin with the threads in the central portion of the bore to translate the pin, and comprising steps of:
    engaging the severable section with a shoulder on the pin; and
    urging the severable section out of contact with the frictional retaining element.

19. The method as defined in claim 18, wherein the step of urging the severable section out of contact with the frictional retaining element comprises rotating the mating threads on the pin through a disengagement length of the threads in the central portion of the bore to cause translation of the pin from engagement of the shoulder with the severable section to disengagement of the severable section from the frictional retaining element and further comprising:
    rotating the socket body with the driving mechanism in the first direction to oppositely translate the pin; and
    withdrawing the mating threads on the pin from the threads in the central portion of the bore.

20. A method for installation of a frangible fastener, the method comprising:
    engaging a socket body with a driving mechanism comprising a gear train, the gear train being reversibly rotatable in a first direction and a second direction, the socket body comprising:
      a gear, operably engaged by the gear train;
      a bore with a first end portion opening on and extending from a first end of the socket body, and wherein:
        a central portion of the bore incorporates threads, the first end portion and the central portion of the bore meet at an engagement point with the threads of the central portion of the bore, commencing at the engagement point with the threads and extending into the central portion of the bore, and a second end portion opening on a second end of the socket body;

a retaining recess, extending circumferentially from the second end portion of the bore; and an O-ring, received in the retaining recess;

frictionally engaging a severable section of the frangible fastener with the O-ring in the retaining recess;

engaging a stud with a pin in the bore in the socket body, the pin comprising:

a head, configured to be engaged by a resilient rotation prevention mechanism in the driving mechanism, the resilient rotation prevention mechanism urging the pin in a longitudinal direction, the resilient rotation prevention mechanism comprising a fork, an ejection shaft, comprising a shoulder and mating threads with a thread length, selectively receivable in the threads of the central portion of the bore, and wherein:

the socket body is freely rotatable, with the mating threads of the ejection shaft positioned in the first end portion of the bore, the thread length is at least as long as a disengagement length to cause translation of the pin upon rotation in the second direction from engagement of the shoulder with the severable section to disengagement of the severable section from the O-ring, and a keyed tip is configured to be received in a bore in the stud;

constraining the pin from rotation by the driving mechanism by engaging flats on the head with the fork;

rotating the gear train and gear to rotate the socket body in the first direction to torque the frangible fastener on the stud;

fracturing the severable section;

rotating the socket body in the second direction;

engaging the mating threads of the ejection shaft in the threads of the central portion of the bore;

translating the pin in the longitudinal direction;

engaging the severable section with the shoulder of the ejection shaft;

urging the severable section from the second end portion by translation of the pin over the disengagement length;

rotating the socket body with the driving mechanism in the first direction to oppositely translate the pin; and withdrawing the mating threads of the ejection shaft from the threads of the central portion of the bore.

\* \* \* \* \*